US012763308B2

(12) United States Patent
Home

(10) Patent No.: US 12,763,308 B2
(45) Date of Patent: Oct. 13, 2026

(54) PROCESS COMPOSITION ANALYSIS VIA ONLINE MASS SPECTROMETRY

(71) Applicant: ConocoPhillips Company, Houston, TX (US)

(72) Inventor: Michael A. Home, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 753 days.

(21) Appl. No.: 17/505,526

(22) Filed: Oct. 19, 2021

(65) Prior Publication Data

US 2022/0122830 A1 Apr. 21, 2022

Related U.S. Application Data

(60) Provisional application No. 63/222,739, filed on Jul. 16, 2021, provisional application No. 63/093,624, filed on Oct. 19, 2020.

(51) Int. Cl.

| | |
|---|---|
| ***H01J 49/26*** | (2006.01) |
| ***F25J 1/00*** | (2006.01) |
| ***F25J 1/02*** | (2006.01) |
| ***G01N 30/72*** | (2006.01) |

(52) U.S. Cl.

CPC ............. *H01J 49/26* (2013.01); *F25J 1/0022* (2013.01); *F25J 1/0255* (2013.01); *F25J 1/0257* (2013.01); *G01N 30/72* (2013.01)

(58) Field of Classification Search

CPC ......... H01J 49/26; F25J 1/0022; F25J 1/0255; F25J 1/0257; G01N 30/72

See application file for complete search history.

(56) References Cited

U.S. PATENT DOCUMENTS

| | | | | |
|---|---|---|---|---|
| 9,791,209 | B2 | 10/2017 | Gandhi et al. | |
| 2003/0182947 | A1 | 10/2003 | Kimble et al. | |
| 2007/0001322 | A1* | 1/2007 | Aikhorin | F17C 7/02 62/625 |
| 2007/0012072 | A1* | 1/2007 | Qualls | F25J 3/0233 62/620 |
| 2009/0151391 | A1 | 6/2009 | Huang et al. | |
| 2009/0277217 | A1 | 11/2009 | Ransbarger et al. | |

(Continued)

FOREIGN PATENT DOCUMENTS

| | | | | |
|---|---|---|---|---|
| CN | 104764795 | A * | 7/2015 | |
| CN | 104764795 | B | 6/2017 | |
| WO | WO-2013087569 | A2 * | 6/2013 | F25J 1/0022 |

OTHER PUBLICATIONS

Machine Translation of CN104764795A (Jun. 5, 2024) (Year: 2024).*

(Continued)

*Primary Examiner* — Matthew J Merkling

(74) *Attorney, Agent, or Firm* — Polsinelli PC

(57) ABSTRACT

A method for improving the efficiency of liquefied natural gas (LNG) liquefaction including receiving a gas feed stream at an LNG facility, condensing the gas feed stream into an LNG product stream, removing nitrogen from the LNG product stream via a nitrogen rejection unit coupled with the LNG facility to produce a final LNG product stream, analyzing one or more process samples taken throughout the liquefaction and nitrogen removal processes via mass spectrometry, and adjusting one or more aspects of the LNG processing system based on the analysis.

15 Claims, 7 Drawing Sheets

(56) References Cited

U.S. PATENT DOCUMENTS

| | | | | |
|---|---|---|---|---|
| 2010/0011663 | A1 | 1/2010 | Coyle | |
| 2012/0180389 | A1 | 7/2012 | Knaebel | |
| 2014/0238035 | A1* | 8/2014 | Knapp .................... | F23N 1/002 60/39.24 |
| 2015/0290575 | A1 | 10/2015 | Rothermel et al. | |
| 2016/0146764 | A1* | 5/2016 | Akmal ..................... | C10G 5/06 73/23.41 |
| 2017/0284737 | A1 | 10/2017 | Chen et al. | |
| 2018/0305273 | A1 | 10/2018 | Patel et al. | |

OTHER PUBLICATIONS

International Search Report and Written Opinion of The International Searching Authority for International application No. PCT/US2021/055673 dated Feb. 2, 2022 (9 pages).
Extended European Search Report for Application No. 21883731.8 dated Oct. 24, 2024 (14 pages).

* cited by examiner

PROCESS COMPOSITION ANALYSIS VIA ONLINE MASS SPECTROMETRY

CROSS-REFERENCE TO RELATED APPLICATIONS

The present application claims priority under 35 U.S.C. § 119 to U.S. Provisional Application No. 63/222,739, entitled "Process Composition Analysis Via Online Mass Spectrometry" and filed on Jul. 16, 2021, and to U.S. Provisional Application No. 63/093,624, entitled "Process Composition Analysis Via Online Mass Spectrometry" and filed on Oct. 19, 2020. Each of these applications is specifically incorporated by reference herein in its entirety.

FIELD

Aspects of the present disclosure relate generally to systems and methods for liquefaction of natural gas and more particularly to the analysis of components within liquefied natural gas (LNG) using mass spectrometry.

BACKGROUND

Natural gas is a commonly used resource comprised of a mixture of naturally occurring hydrocarbon gases typically found in deep underground natural rock formations or other hydrocarbon reservoirs. More particularly, natural gas is primarily comprised of methane and often includes other components, such as, ethane, propane, carbon dioxide, nitrogen, hydrogen sulfide, and/or the like.

Cryogenic liquefaction generally converts the natural gas into a convenient form for transportation and storage. More particularly, under standard atmospheric conditions, natural gas exists in vapor phase and is subjected to certain thermodynamic processes to produce LNG. Liquefying natural gas greatly reduces its specific volume, such that large quantities of natural gas can be economically transported and stored in liquefied form.

The presence of negligible amounts of nitrogen in liquefied natural gas is acceptable, however excessive amounts can lower the energy value per volume of natural gas. Additionally, a high nitrogen concentration can make it difficult to fully condense the natural gas into a liquid natural gas. In order to remove excess nitrogen, the liquefied natural gas can be passed through a nitrogen rejection unit. Nitrogen rejection units can be integrated into an LNG facility. The resulting reduced liquefied natural gas stream can be analyzed. For example, the reduced stream may be passed through and/or analyzed by one or more gas chromatographs to evaluate and determine the effectiveness of the nitrogen removal process. In addition to testing the final liquefied natural gas stream, compositional analysis of several intermediate process streams can be performed to monitor the nitrogen movement throughout the process. Such analyses can include mass balancing through compositional analysis of the streams. The analysis can then be used to determine whether adjustments to the processes are required.

At various points throughout and at the completion of the liquefaction and nitrogen removal processes, multiple gas chromatographs can be used to perform composition measurements to evaluate performance of the LNG facility. Gas chromatographs suffer from a number of deficiencies. In addition to requiring a large amount of consumables, gas chromatographs yield analyses that are less accurate than desired. For example, gas chromatographs provide poor linearity of measurement response across full scale, suffer from large measurement delays and slow measurement update rates, and are unduly burdensome due to various calibration and maintenance requirements.

It is with these observations in mind, among others, that various aspects of the present disclosure were conceived and developed.

SUMMARY

Implementations described and claimed herein address the foregoing problems by providing systems and methods for analyzing and optimizing a liquefied natural gas (LNG) process. In some implementations, a method to improve liquefied natural gas (LNG) liquefaction comprises: receiving a gas feed stream; condensing the gas feed stream into an LNG product stream; removing nitrogen from the LNG product stream to produce a final LNG product stream; and monitoring component content by performing a compositional analysis of one or more process samples via mass spectrometry. The one or more process samples can be taken from the final LNG product stream and a plurality of intermediate streams. Moreover, the method can further comprise evaluating a nitrogen (N2) content determined by the compositional analysis; evaluating a methane (CH4) content determined by the compositional analysis; and/or determining a nitrogen/methane (N2/CH4) ratio of the one or more process samples. Additionally, the compositional analysis can further comprise determining an ethane (C2H6) content.

In some examples, a method to improve liquefied natural gas (LNG) liquefaction comprises: receiving a gas feed stream; condensing the gas feed stream into an LNG product stream; removing nitrogen from the LNG product stream to produce a final LNG product stream; monitoring a component content by performing a compositional analysis of one or more process samples via mass spectrometry; and adjusting one or more LNG facility parameters of an LNG facility based on the component content. The method can further comprise: monitoring the component content of a plurality of the one or more process samples simultaneously via the mass spectrometry. Additionally, the compositional analysis can be performed by a mass spectrometer and can provide one or more of a nitrogen (N2) content, a methane (CH4) content, or an ethane (C2H6) content. In some instances, monitoring the component content includes performing the compositional analysis on a plurality of process samples from the final LNG product stream.

In some instances, the method further includes transmitting, via a communications network, the compositional analysis of the mass spectrometry to a control logic; and calculating, using the control logic, an efficiency for the LNG facility based on the compositional analysis of the mass spectrometry. The method can further comprise determining whether the efficiency of the LNG facility exceeds a predetermined threshold. Additionally, when the efficiency exceeds the predetermined threshold, the method can further include: calculating one or more adjustments to the LNG facility and/or a nitrogen rejection unit coupled with the LNG facility based on whether the efficiency is below the predetermined threshold; and transmitting, via the communications network, the one or more adjustments to the LNG facility and/or the nitrogen rejection unit. Moreover, the one or more adjustments can be based in part on at least one of a nitrogen (N2) content, a methane (CH4) content, or an ethane (C2H6) content of the one or more process samples.

In some examples, a system to improve liquefied natural gas (LNG) liquefaction comprises: an LNG facility operable to condense a gas feed stream received at the LNG facility into a LNG product stream; a nitrogen rejection unit coupled with the LNG facility, the nitrogen rejection unit operable to remove nitrogen from the LNG product stream to produce a final LNG product stream; and an analyzer coupled with the LNG facility or the nitrogen rejection unit operable to obtain mass spectrometry data for one or more process samples, the analyzer including a mass spectrometer. The system can further comprise a control logic operable to receive the mass spectrometry data from the analyzer and determine whether an efficiency of the LNG facility exceeds a predetermined threshold. The control logic can be further operable to calculate, when the efficiency is below the predetermined threshold, one or more adjustments of the LNG facility or the nitrogen rejection unit to cause the efficiency to increase. Additionally, the control logic can be further operable to transmit, via a communications network, the one or more adjustments to the LNG facility or the nitrogen rejection unit. In some instances, a compositional analysis of the mass spectrometry data includes one or more of a nitrogen (N2) content, a methane (CH4) content, or an ethane (C2H6) content. Finally, the one or more process samples can include a plurality of process samples from the final LNG product stream; and obtaining the mass spectrometry data can include performing compositional analysis on the plurality of process samples.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects all without departing from the spirit and scope of the presently disclosed technology. Accordingly, the drawings and detailed description are to be regarded as illustrative in nature and not limiting.

BRIEF DESCRIPTION OF THE DRAWINGS

The foregoing summary, as well as the following detailed description, will be better understood when read in conjunction with the appended drawings. For the purpose of illustration, there are shown in the drawings certain embodiments of the present inventive concept. It should be understood, however, that the present inventive concept is not limited to the precise embodiments and features shown. The accompanying drawings, which are incorporated in and constitute a part of this specification, illustrate an implementation of apparatuses consistent with the present inventive concept and, together with the description, serve to explain advantages and principles consistent with the present inventive concept, in which.

DETAILED DESCRIPTION

Figure 1:
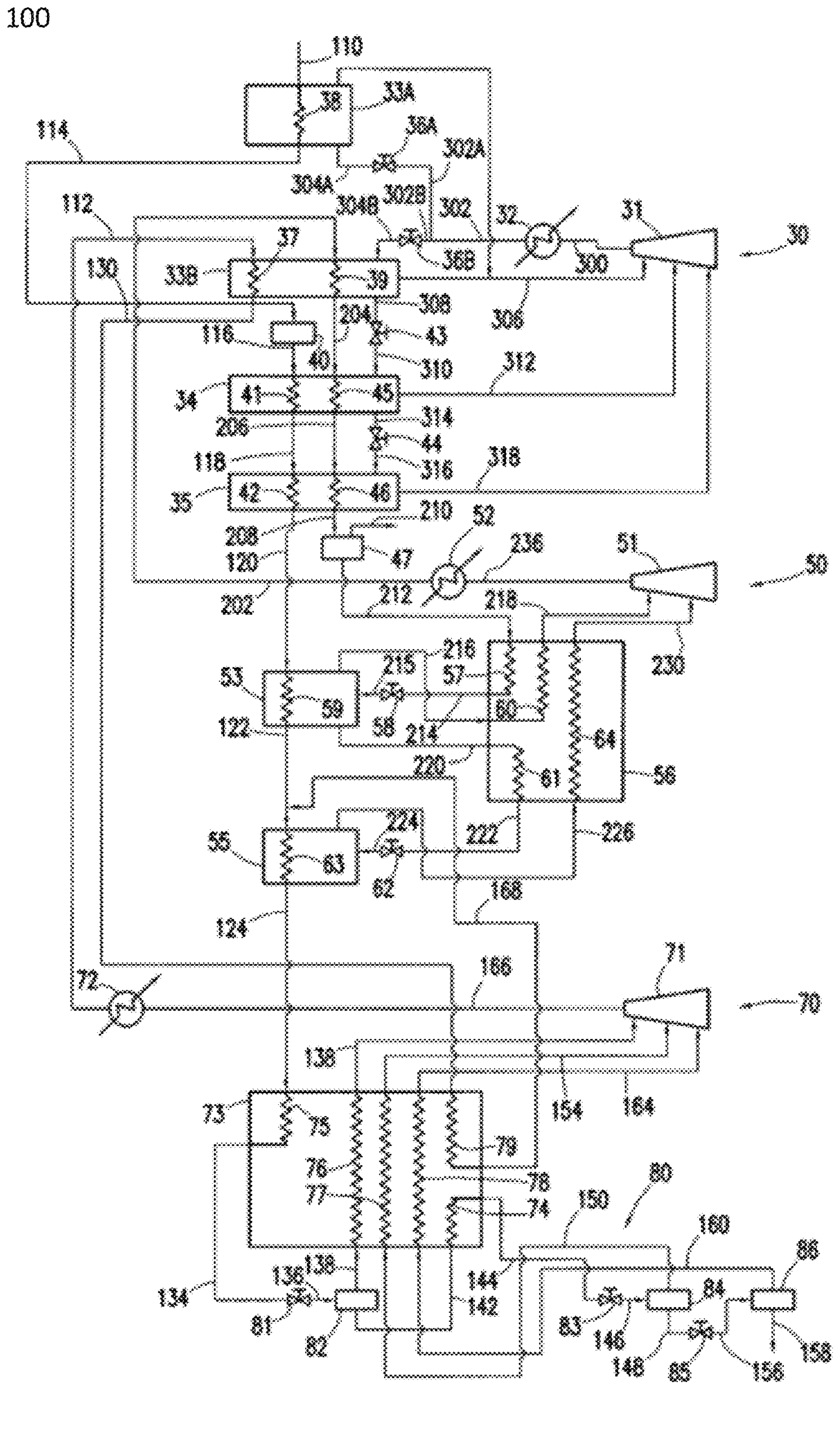
FIG. 1 illustrates an example simplified flow diagram of a cascade refrigeration process operable with a nitrogen rejection unit and mass spectrometry analyzer.

Aspects of the present disclosure involve systems and methods for analyzing elemental chemical components of a natural gas stream after liquefaction and nitrogen removal using an LNG facility. In general, LNG facilities can include one or more nitrogen rejection units capable of removing nitrogen from natural gas streams and/or liquefied natural gas streams. Such facilities often contain multiple analyzers, such as gas chromatographs, which are used to analyze various components associated with the liquefied natural gas process. The levels of various chemical components of the gas stream can be used to determine the effectiveness of the liquefaction of the natural gas and the nitrogen removal process. Accordingly, determinations can be made regarding various aspects of the LNG facility based on the analysis.

Analysis of the required components using gas chromatography can require several gas chromatographs and can be slow to produce the desired results. Thus, in one aspect, a mass spectrometer is integrated into the LNG facility. More particularly, the mass spectrometer is coupled with the LNG facility in place of the series of gas chromatographs allowing the mass spectrometer to analyze the desired components both during and after the liquefaction and nitrogen removal processes are complete. The mass spectrometer can allow a larger quantity of analyses to be run on a single machine in a shorter time period as compared to the same analyses run on a series of gas chromatographs. When compared to a gas chromatograph, the use of a mass spectrometer can provide a significantly shorter analysis time, significantly lower delay between measurement and process, an improved frequency of measurements, a greatly improved range of measurement, reduced calibration requirements, an ability to cyclically measure numerous samples of differing composition, a lower operational expenditure per sample point to be analyzed, and does not require expensive consumables.

Examples, various features, and advantageous details thereof are explained more fully with reference to the exemplary, and therefore non-limited, examples illustrated in the accompanying drawings and detailed in the following description. Descriptions of known starting materials and processes can be omitted so as not to unnecessarily obscure the disclosure in the detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

I. Terminology

The liquefaction process described herein may incorporate one or more of several types of cooling systems and methods including, but not limited to, component analysis using mass spectrometry.

Indirect heat exchange, as used herein, refers to a process involving a cooler stream cooling a substance without actual physical contact between the cooler stream and the substance to be cooled. Specific examples of indirect heat exchange include, but are not limited to, heat exchange undergone in a shell-and-tube heat exchanger, a core-in-shell heat exchanger, and a brazed aluminum plate-fin heat exchanger. The specific physical state of the refrigerant and substance to be cooled can vary depending on demands of the refrigeration system and type of heat exchanger chosen.

Expansion or pressure reduction cooling refers to cooling which occurs when the pressure of a gas, liquid or a two-phase system is decreased by passing through a pressure reduction means. In some implementations, the expansion means may be a Joule-Thomson expansion valve. In other implementations, the expansion means may be either a hydraulic or gas expander. Because expanders recover work energy from the expansion process, lower process stream temperatures are possible upon expansion.

Mass spectrometry analysis, as used herein, refers to an analytical technique which measures the mass-to-charge ratio of ions. Mass spectrometry analysis can be used to evaluate various types of samples including, but not limited to a solid, a liquid, or a gas.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, any one of the features in the present description may be used separately or in combination with any other feature. For example, references to the term "implementation" means that the feature or features being referred to are included in at least one aspect of the present description. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the present description may include a variety of combinations and/or integrations of the implementations described herein. Additionally, all aspects of the present inventive concept as described herein are not essential for its practice.

II. General Architecture and Operations

Some LNG projects introduce pipelines as a source of feed gas in an LNG Optimized Cascade Process (OCP). The Optimized Cascade Process is based on three multi-staged, cascading refrigerants circuits using pure refrigerants, brazed aluminum heat exchangers and insulated cold box modules. Pure refrigerants of propane (or propylene), ethylene, and methane may be utilized. Numerous configurations of LNG systems exist and may be used in conjunction with the analysis processes described herein.

In at least one instance, the Optimized Cascade Process can further include a nitrogen rejection unit to extract excess nitrogen from the resulting liquefied natural gas produced. In the alternative, the OCP can include a nitrogen rejection unit integrated into the liquefaction process. The OCP may use a mass spectrometer to analyze the chemical components of the resulting stream produced by the LNG and nitrogen removal process to evaluate chemical levels as well as process efficiency. In the usual case, LNG processes include a series of gas chromatographs to perform content analyses of the stream. However, such analyses can be performed more quickly and more accurately using mass spectrometry analysis, as described herein. The information gathered by the mass spectrometer can then be used to monitor chemical levels and LNG process performance to determine if adjustments to the process are required. The mass spectrometry analysis can also include a feedback loop to a control logic, which can provide the LNG process with information regarding the efficiency of the liquefaction and nitrogen removal.

The presently disclosed technology may be implemented in a cascade LNG system employing a cascade-type refrigeration process using one or more predominately pure component refrigerants. The refrigerants utilized in cascade-type refrigeration processes can have successively lower boiling points to facilitate heat removal from the natural gas stream that is being liquefied. Additionally, cascade-type refrigeration processes can include some level of heat integration. For example, a cascade-type refrigeration process can cool one or more refrigerants having a higher volatility through indirect heat exchange with one or more refrigerants having a lower volatility. In addition to cooling the natural gas stream through indirect heat exchange with one or more refrigerants, cascade and mixed-refrigerant LNG systems can employ one or more expansion cooling stages to simultaneously cool the LNG while reducing its pressure.

In one implementation, the LNG process may employ a cascade-type refrigeration process that uses a plurality of multi-stage cooling cycles, each employing a different refrigerant composition, to sequentially cool the natural gas stream to lower and lower temperatures. For example, a first refrigerant may be used to cool a first refrigeration cycle. A second refrigerant may be used to cool a second refrigeration cycle. A third refrigerant may be used to cool a third refrigeration cycle. Each refrigeration cycle may include a closed cycle or an open cycle. The terms "first", "second", and "third" refer to the relative position of a refrigeration cycle. For example, the first refrigeration cycle is positioned just upstream of the second refrigeration cycle while the second refrigeration cycle is positioned upstream of the third refrigeration cycle and so forth. While at least one reference to a cascade LNG process comprising three different refrigerants in three separate refrigeration cycles is made, this is not intended to be limiting. It is recognized that a cascade LNG process involving any number of refrigerants and/or refrigeration cycles may be compatible with one or more implementations of the presently disclosed technology. Other variations to the cascade LNG process are also contemplated. It will also be appreciated that the presently disclosed technology may be utilized in non-cascade LNG processes. One example of a non-cascade LNG process involves a mixed refrigerant LNG process that employs a combination of two or more refrigerants to cool the natural gas stream in at least one cooling cycle.

Figure 2:
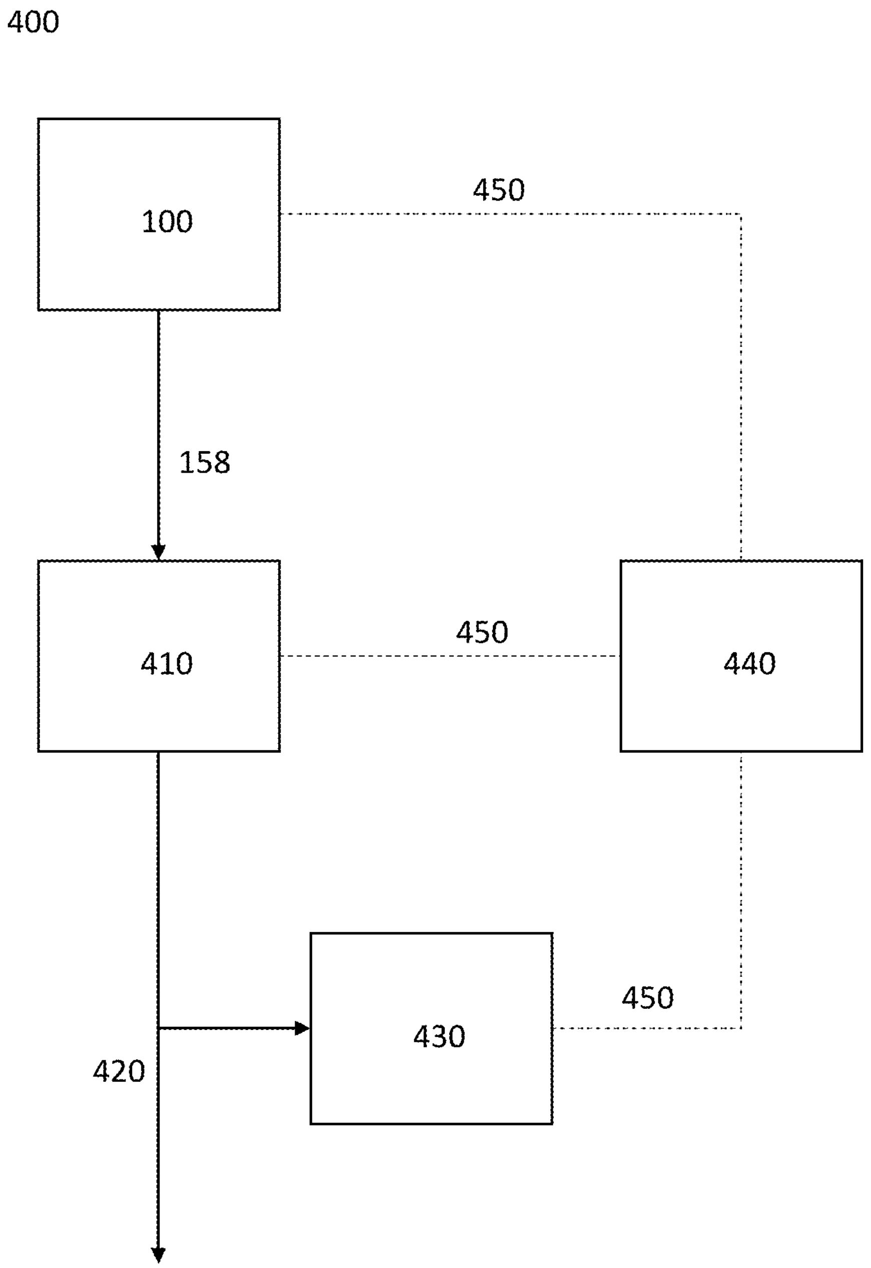
FIG. 2 illustrates an example LNG production system with a nitrogen rejection unit and analyzer.

To begin a detailed description of an example cascade LNG facility 100 in accordance with the implementations described herein, reference is made to FIG. 1. The LNG facility 100 generally comprises a first refrigeration cycle (such as, a propane refrigeration cycle 30), a second refrigeration cycle (such as, an ethylene refrigeration cycle 50), and a third refrigeration cycle (such as, a methane refrigeration cycle 70) with an expansion section 80. FIG. 2 illustrates an example LNG production system 400 with a nitrogen rejection unit which can be integrated with an LNG production facility, such as the LNG facility 100 of FIG. 1. Those skilled in the art will recognize that FIGS. 1 and 2 are schematic only and, therefore, various equipment, apparatuses, or systems that would be needed in a commercial plant for successful operation have been omitted for clarity. Such components might include, for example, compressor controls, flow and level measurements and corresponding controllers, temperature and pressure controls, pumps, motors, filters, additional heat exchangers, valves, and/or the like. Those skilled in the art will recognize such components and how they are integrated into the systems and methods disclosed herein.

In one implementation, the main components of the propane refrigeration cycle 30 include a multi-stage propane compressor 31, a propane cooler/condenser 32, a high-stage propane chillers 33A and 33B, an intermediate-stage propane chiller 34, and a low-stage propane chiller 35. The main components of ethylene refrigeration cycle 50 include an ethylene compressor 51, an ethylene cooler 52, a high-stage ethylene chiller 53, a low-stage ethylene chiller/condenser 55, and an ethylene economizer 56. The main components of methane refrigeration cycle 70 include a methane compressor 71, a methane cooler 72, and a main methane economizer 73. The main components of expansion section 80 include a high-stage methane expansion valve and/or expander 81, a high-stage methane flash drum 82, an expander/intermediate-stage methane expansion valve 83, an intermediate-stage methane flash drum 84, an expander/low-stage methane expansion valve 85, and a low-stage methane flash drum 86. While “propane,” “ethylene,” and “methane” are used to refer to respective first, second, and third refrigerants, it should be understood that these are examples only, and the presently disclosed technology may involve any combination of suitable refrigerants.

Referring to FIG. 1, in one implementation, operation of the LNG facility 100 begins with the propane refrigeration cycle 30. Propane is compressed in the propane compressor 31 driven by, for example, a gas turbine driver (not illustrated). The stages of compression may exist in a single unit or a plurality of separate units mechanically coupled to a single driver. Upon compression, the propane is passed through a conduit 300 to a propane cooler/condenser 32 where the propane is cooled and liquefied through indirect heat exchange with an external fluid (such as, air or water). A portion of the stream from the propane cooler/condenser 32 can then be passed through conduits 302 and 302A to a pressure reduction system 36A, for example, an expansion valve, as illustrated in FIG. 1. At the pressure reduction system 36A, the pressure of the liquefied propane is reduced, thereby evaporating or flashing a portion of the liquefied propane. A resulting two-phase stream then flows through a conduit 304A into the high-stage propane chiller 33A, which cools the natural gas stream in indirect heat exchange 38. The high stage propane chiller 33A uses the flashed propane refrigerant to cool the incoming natural gas stream in a conduit 110. Another portion of the stream from the propane cooler/condenser 32 is routed through a conduit 302B to another pressure reduction system 36B, illustrated, for example, in FIG. 1 as an expansion valve. At the pressure reduction system 36B, the pressure of the liquefied propane is reduced in a stream 304B.

The cooled natural gas stream from the high-stage propane chiller 33A flows through a conduit 114 to a separation vessel. At the separation vessel, water and in some cases a portion of the propane and/or heavier components are removed. In some cases where removal is not completed in upstream processing, a treatment system 40 may follow the separation vessel. The treatment system 40 removes moisture, mercury and mercury compounds, particulates, and other contaminants to create a treated stream. The stream exits the treatment system 40 through a conduit 116. The stream then enters the intermediate-stage propane chiller 34. At the intermediate-stage propane chiller 34, the stream is cooled in indirect heat exchange 41 via indirect heat exchange with a propane refrigerant stream. The resulting cooled stream output into a conduit 118 is routed to the low-stage propane chiller 35, where the stream can be further cooled through indirect heat exchange means 42. The resultant cooled stream exits the low-stage propane chiller 35 through a conduit 120. Subsequently, the cooled stream in the conduit 120 is routed to the high-stage ethylene chiller 53.

A vaporized propane refrigerant stream exiting the high-stage propane chillers 33A and 33B is returned to a high-stage inlet port of the propane compressor 31 through a conduit 306. An un-vaporized propane refrigerant stream exits the high-stage propane chiller 33B via a conduit 308 and is flashed via a pressure reduction system 43, illustrated, for example, in FIG. 1 as an expansion valve. The liquid propane refrigerant in the high-stage propane chiller 33A provides refrigeration duty for the natural gas stream. A two-phase refrigerant stream enters the intermediate-stage propane chiller 34 through a conduit 310, thereby providing coolant for the natural gas stream (in conduit 116) and the stream entering the intermediate-stage propane chiller 34 through a conduit 204. The vaporized portion of the propane refrigerant exits the intermediate-stage propane chiller 34 through a conduit 312 and enters an intermediate-stage inlet port of the propane compressor 31. The liquefied portion of the propane refrigerant exits the intermediate-stage propane chiller 34 through a conduit 314 and is passed through a pressure-reduction system 44, for example an expansion valve, whereupon the pressure of the liquefied propane refrigerant is reduced to flash or vaporize a portion of the liquefied propane. The resulting vapor-liquid refrigerant stream is routed to the low-stage propane chiller 35 through a conduit 316. At the low-stage propane chiller 35, the refrigerant stream cools the methane-rich stream and an ethylene refrigerant stream entering the low-stage propane chiller 35 through the conduits 118 and 206, respectively. The vaporized propane refrigerant stream exits the low-stage propane chiller 35 and is routed to a low-stage inlet port of the propane compressor 31 through a conduit 318. The vaporized propane refrigerant stream is compressed and recycled at the propane compressor 31 as previously described.

In one implementation, a stream of ethylene refrigerant in a conduit 202 enters the high-stage propane chiller 33B. At the high-stage propane chiller 33B, the ethylene stream is cooled through indirect heat exchange 39. The resulting cooled ethylene stream is routed in the conduit 204 from the high-stage propane chiller 33B to the intermediate-stage propane chiller 34. Upon entering the intermediate-stage propane chiller 34, the ethylene refrigerant stream may be further cooled through indirect heat exchange 45 in the intermediate-stage propane chiller 34. The resulting cooled ethylene stream exits the intermediate-stage propane chiller 34 and is routed through a conduit 206 to enter the low-stage propane chiller 35. In the low-stage propane chiller 35, the ethylene refrigerant stream is at least partially condensed, or condensed in its entirety, through indirect heat exchange 46. The resulting stream exits the low-stage propane chiller 35 through a conduit 208 and may be routed to a separation vessel 47. At the separation vessel 47, a vapor portion of the stream, if present, is removed through a conduit 210, while a liquid portion of the ethylene refrigerant stream exits the separation vessel 47 through a conduit 212. The liquid portion of the ethylene refrigerant stream exiting the separation vessel 47 may have a representative temperature and pressure of about −24° F. (about −31° C.) and about 285 psia (about 1,965 kPa). However, other temperatures and pressures are contemplated.

Turning now to the ethylene refrigeration cycle 50 in the LNG facility 100, in one implementation, the liquefied ethylene refrigerant stream in the conduit 212 enters an ethylene economizer 56, and the stream is further cooled by an indirect heat exchange 57 at the ethylene economizer 56. The resulting cooled liquid ethylene stream is output into a conduit 214 and routed through a pressure reduction system 58, such as an expansion valve. The pressure reduction system 58 reduces the pressure of the cooled predominantly liquid ethylene stream to flash or vaporize a portion of the stream. The cooled, two-phase stream in a conduit 215 enters the high-stage ethylene chiller 53. In the high-stage ethylene chiller 53, at least a portion of the ethylene refrigerant stream vaporizes to further cool the stream in the conduit 120 entering an indirect heat exchange 59. The vaporized and remaining liquefied ethylene refrigerant exits the high-stage ethylene chiller 53 through conduits 216 and 220, respectively. The vaporized ethylene refrigerant in the conduit 216 may re-enter the ethylene economizer 56, and the ethylene economizer 56 warms the stream through an indirect heat exchange 60 prior to entering a high-stage inlet port of the ethylene compressor 51 through a conduit 218. Ethylene is compressed in multi-stages (such as, three-stage) at the ethylene compressor 51 driven by, for example, a gas turbine driver (not illustrated). The stages of compression may exist in a single unit or a plurality of separate units mechanically coupled to a single driver.

The cooled stream in the conduit 120 exiting the low-stage propane chiller 35 is routed to the high-stage ethylene chiller 53, where it is cooled via the indirect heat exchange 59 of the high-stage ethylene chiller 53. The remaining liquefied ethylene refrigerant exiting the high-stage ethylene chiller 53 in a conduit 220 may re-enter the ethylene economizer 56 and undergo further sub-cooling by an indirect heat exchange 61 in the ethylene economizer 56. The resulting sub-cooled refrigerant stream exits the ethylene economizer 56 through a conduit 222 and passes a pressure reduction system 62, such as an expansion valve, whereupon the pressure of the refrigerant stream is reduced to vaporize or flash a portion of the refrigerant stream. The resulting, cooled two-phase stream in a conduit 224 enters the low-stage ethylene chiller/condenser 55.

A portion of the cooled natural gas stream exiting the high-stage ethylene chiller 53 is routed through conduit a 122 to enter an indirect heat exchange 63 of the low-stage ethylene chiller/condenser 55. In the low-stage ethylene chiller/condenser 55, the cooled stream is at least partially condensed and, often, subcooled through indirect heat exchange with the ethylene refrigerant entering the low-stage ethylene chiller/condenser 55 through the conduit 224. The vaporized ethylene refrigerant exits the low-stage ethylene chiller/condenser 55 through a conduit 226, which then enters the ethylene economizer 56. In the ethylene economizer 56, vaporized ethylene refrigerant stream is warmed through an indirect heat exchange 64 prior to being fed into a low-stage inlet port of the ethylene compressor 51 through a conduit 230. As shown in FIG. 1, a stream of compressed ethylene refrigerant exits the ethylene compressor 51 through a conduit 236 and subsequently enters the ethylene cooler 52. At the ethylene cooler 52, the compressed ethylene stream is cooled through indirect heat exchange with an external fluid (such as, water or air). The resulting cooled ethylene stream may be introduced through the conduit 202 into high-stage propane chiller 33B for additional cooling, as previously described.

The condensed and, often, sub-cooled liquid natural gas stream exiting the low-stage ethylene chiller/condenser 55 in a conduit 124 can also be referred to as a “pressurized LNG-bearing stream.” This pressurized LNG-bearing stream exits the low-stage ethylene chiller/condenser 55 through the conduit 124 prior to entering a main methane economizer 73. In the main methane economizer 73, methane-rich stream in the conduit 124 may be further cooled in an indirect heat exchange 75 through indirect heat exchange with one or more methane refrigerant streams (such as, 76, 77, 78). The cooled, pressurized LNG-bearing stream exits the main methane economizer 73 through a conduit 134 and is routed to the expansion section 80 of the methane refrigeration cycle 70. In the expansion section 80, the pressurized LNG-bearing stream first passes through a high-stage methane expansion valve or expander 81, whereupon the pressure of this stream is reduced to vaporize or flash a portion thereof. The resulting two-phase methane-rich stream in a conduit 136 enters into a high-stage methane flash drum 82. In the high-stage methane flash drum 82, the vapor and liquid portions of the reduced-pressure stream are separated. The vapor portion of the reduced-pressure stream (also called the high-stage flash gas) exits the high-stage methane flash drum 82 through a conduit 138 and enters into the main methane economizer 73. At the main methane economizer 73, at least a portion of the high-stage flash gas is heated through the indirect heat exchange means 76 of the main methane economizer 73. The resulting warmed vapor stream exits the main methane economizer 73 through the conduit 138 and is routed to a high-stage inlet port of the methane compressor 71, as shown in FIG. 1.

The liquid portion of the reduced-pressure stream exits the high-stage methane flash drum 82 through a conduit 142 and re-enters the main methane economizer 73. The main methane economizer 73 cools the liquid stream through indirect heat exchange 74 of the main methane economizer 73. The resulting cooled stream exits the main methane economizer 73 through a conduit 144 and is routed to a second expansion stage, illustrated as an example in FIG. 1 as intermediate-stage expansion valve 83 and/or expander. The intermediate-stage expansion valve 83 further reduces the pressure of the cooled methane stream, which reduces a temperature of the stream by vaporizing or flashing a portion of the stream. The resulting two-phase methane-rich stream output in a conduit 146 enters the intermediate-stage methane flash drum 84. Liquid and vapor portions of the stream are separated in the intermediate-stage methane flash drum 84 and output through conduits 148 and 150, respectively. The vapor portion (also called the intermediate-stage flash gas) in the conduit 150 re-enters the main methane economizer 73, wherein the vapor portion is heated through an indirect heat exchange 77 of the main methane economizer

73. The resulting warmed stream is routed through a conduit 154 to the intermediate-stage inlet port of methane compressor 71.

The liquid stream exiting the intermediate-stage methane flash drum 84 through the conduit 148 passes through an expander/low-stage expansion valve 85, whereupon the pressure of the liquefied methane-rich stream is further reduced to vaporize or flash a portion of the stream. The resulting cooled two-phase stream is output in a conduit 156 and enters a low-stage methane flash drum 86, which separates the vapor and liquid phases. The liquid stream exiting the low-stage methane flash drum 86 through a conduit 158 comprises the liquefied natural gas (LNG) product at near atmospheric pressure. This LNG product may be routed downstream for subsequent storage, transportation, and/or use.

A vapor stream exiting the low-stage methane flash drum 86 (also called the low-stage methane flash gas) in a conduit 160 is routed to the main methane economizer 73. The main methane economizer 73 warms the low-stage methane flash gas through an indirect heat exchange 78 of the main methane economizer 73. The resulting stream exits the main methane economizer 73 through a conduit 164. The stream is then routed to a low-stage inlet port of the methane compressor 71.

The methane compressor 71 comprises one or more compression stages. In one implementation, the methane compressor 71 comprises three compression stages in a single module. In another implementation, one or more of the compression modules are separate but mechanically coupled to a common driver. Generally, one or more intercoolers (not shown) are provided between subsequent compression stages.

As shown in FIG. 1, a compressed methane refrigerant stream exiting the methane compressor 71 is discharged into a conduit 166. The compressed methane refrigerant is routed to the methane cooler 72, and the stream is cooled through indirect heat exchange with an external fluid (such as, air or water) in the methane cooler 72. The resulting cooled methane refrigerant stream exits the methane cooler 72 through a conduit 112 and is directed to and further cooled in the propane refrigeration cycle 30. Upon cooling in the propane refrigeration cycle 30 through a heat exchanger 37, the methane refrigerant stream is discharged into a conduit 130 and subsequently routed to the main methane economizer 73, and the stream is further cooled through indirect heat exchange 79. The resulting sub-cooled stream exits the main methane economizer 73 through a conduit 168 and then combined with the stream in the conduit 122 exiting the high-stage ethylene chiller 53 prior to entering the low-stage ethylene chiller/condenser 55, as previously discussed.

In some cases, excessive amounts of nitrogen are removed from the liquefied natural gas stream through the use of one or more nitrogen rejection units used in conjunction with a cascade LNG system as described above. Nitrogen ($N_2$) is most efficiently removed from natural gas at cryogenic temperatures. As such, the nitrogen rejection unit as described herein can be coupled with or integrated into one or more insulated elements of the above LNG system. In the alternative, the nitrogen rejection unit can be housed in a separate insulated enclosure coupled with the LNG system. In one implementation a plurality of streams can be run through the nitrogen rejection unit simultaneously. A compositional analysis of various streams throughout the liquefaction and nitrogen removal processes can be performed and the results analyzed via mass balancing to evaluate the movement of nitrogen ($N_2$) within the nitrogen rejection unit and consequently the removal of nitrogen from the LNG product stream. An analysis of the each of the streams obtained at various points throughout the LNG facility can then be analyzed to determine the component contents including, but not limited to a nitrogen ($N_2$) content, a methane ($CH_4$) content, an ethane ($C_2H_6$) content, a propane ($C_3H_8$) content, a carbon dioxide ($CO_2$) content, a hydrogen sulfide ($H_2S$) content, and/or combinations thereof. In at least one instance, process streams are sampled at more than eight intermediate locations throughout the process. For example, the nitrogen content ($N_2$) can be determined at various points including prior to entering the nitrogen rejection unit, any area throughout the process where gas is vented, flared, or removed from the process, and in the final LNG product. Typically, such compositional analyses are conducted using a gas chromatography. However, the gas chromatographs can be slow and multiple gas chromatographs are required in order to process each of the desired streams. It has been determined that the required compositional analyses can be performed more quickly and more accurately using mass spectrometry.

In one implementation, the series of gas chromatographs typically used within an LNG facility is replaced with a single mass spectrometer. The mass spectrometer can be used to analyze the various component contents, such as elemental concentration, of the intermediate stream and final liquefied natural gas stream and correspondingly determine the efficiency of the liquifaction and nitrogen removal process. In at least one implementation, the component content analysis can include one or more of a methane ($CH_4$) content, a nitrogen ($N_2$) content, an ethane ($C_2H_6$) content, a propane ($C_3H_8$) content, a carbon dioxide ($CO_2$) content, a hydrogen sulfide ($H_2S$) content, and/or combinations thereof. The information obtained from the mass spectrometry analysis can be included in a feedback loop and used to control or adjust various aspects of the LNG facility to improve the efficiency of the process. The single mass spectrometer can be used to analyze a plurality of sample process streams typically analyzed using a series of gas chromatographs. As described above, the sample process streams can be taken at various points throughout and at the completion of the liquefaction process. The mass spectrometer analysis and control of the presently disclosed technology thus provides increased speed and accuracy of elemental component analysis, as described with respect to FIG. 2. The mass spectrometer can be coupled with the LNG processing stream to obtain one or more sample process streams directly from the LNG system, thereby providing fast analysis and control feedback to the LNG facility. In at least one instance, additional mass spectrometer analyzers may be installed in parallel to provide redundancy to the compositional measurements.

Turning to FIG. 2, an example LNG production system 400 is illustrated having the LNG facility 100, such as that described above, coupled with a nitrogen rejection unit 410 and an analyzer 430. In one implementation, the LNG product in conduit 158 can be transferred from the LNG facility 100 to a nitrogen rejection unit 410 to remove excess nitrogen from the LNG product. The nitrogen rejection unit can include one or more nitrogen rejection columns. Each nitrogen rejection column can include one or more condensers that are configured to condense a nitrogen-containing stream out of the LNG product. In one implementation, the nitrogen rejection unit 410 can be coupled with the LNG facility 100 as illustrated in FIG. 2. In an alternative implementation, the nitrogen rejection unit can be integrated into an LNG facility such that the nitrogen is removed during the liquefaction process.

After the final LNG product stream 420 exits the nitrogen rejection unit 410, one or more samples can be transferred to an analyzer 430. In at least one instance, the analyzer 430 is a mass spectrometry analyzer as described above. In one implementation, one or more redundant mass spectrometry analyzers can be included in the LNG production system 400. The mass spectrometer can analyze the final LNG product stream 420 to determine one or more component content levels, as described above. In another instance, the analyzer 430 can further include a computing system coupled with the mass spectrometer operable to analyze the component content data obtained. While FIG. 2 illustrates an analyzer 430 operable to obtain samples directly from the LNG product stream 420 it should be generally understood that the analyzer 430 can also be configured to obtain samples from various points throughout the LNG production system 400. The additional samples can be used to monitor and track the movement of various contents throughout the liquefaction process. In at least one instance, the compositional analysis of certain process streams are merely indicative of the process. In some instances, the compositional analysis of some or all of the sample streams can then be transmitted directly to a control logic 440 coupled with the analyzer 430 via a communications network 450. In at least one instance, the control logic 440 can be a controller. In at least one instance, the communications network 450 can be any suitable wired or wireless network.

The control logic 440 can include one or more processors capable of receiving the analysis transmitted by the analyzer 430 and determine an effectiveness of the LNG facility 100 and nitrogen rejection unit 410 based at least in part on the compositional analysis results for each of the sample streams. If the effectiveness of the LNG facility 100 or the nitrogen rejection unit 410 is determined to be below a predetermined level, the control logic 440 can one or more adjustments to the LNG facility 100 or the nitrogen rejection unit 410 to bring the effectiveness within the predetermined limit. The control logic 440 can then transmit instructions relating to the adjustments to one or both of the LNG facility 100 and the nitrogen rejection unit 410 via the communications network 450.

Additionally, while FIG. 2 generally depicts a single analyzer 430, it should be generally understood that one or more redundant analyzers 430 can be included to verify the compositional analysis results or if the primary analyzer 430 requires repairs.

Figure 3:
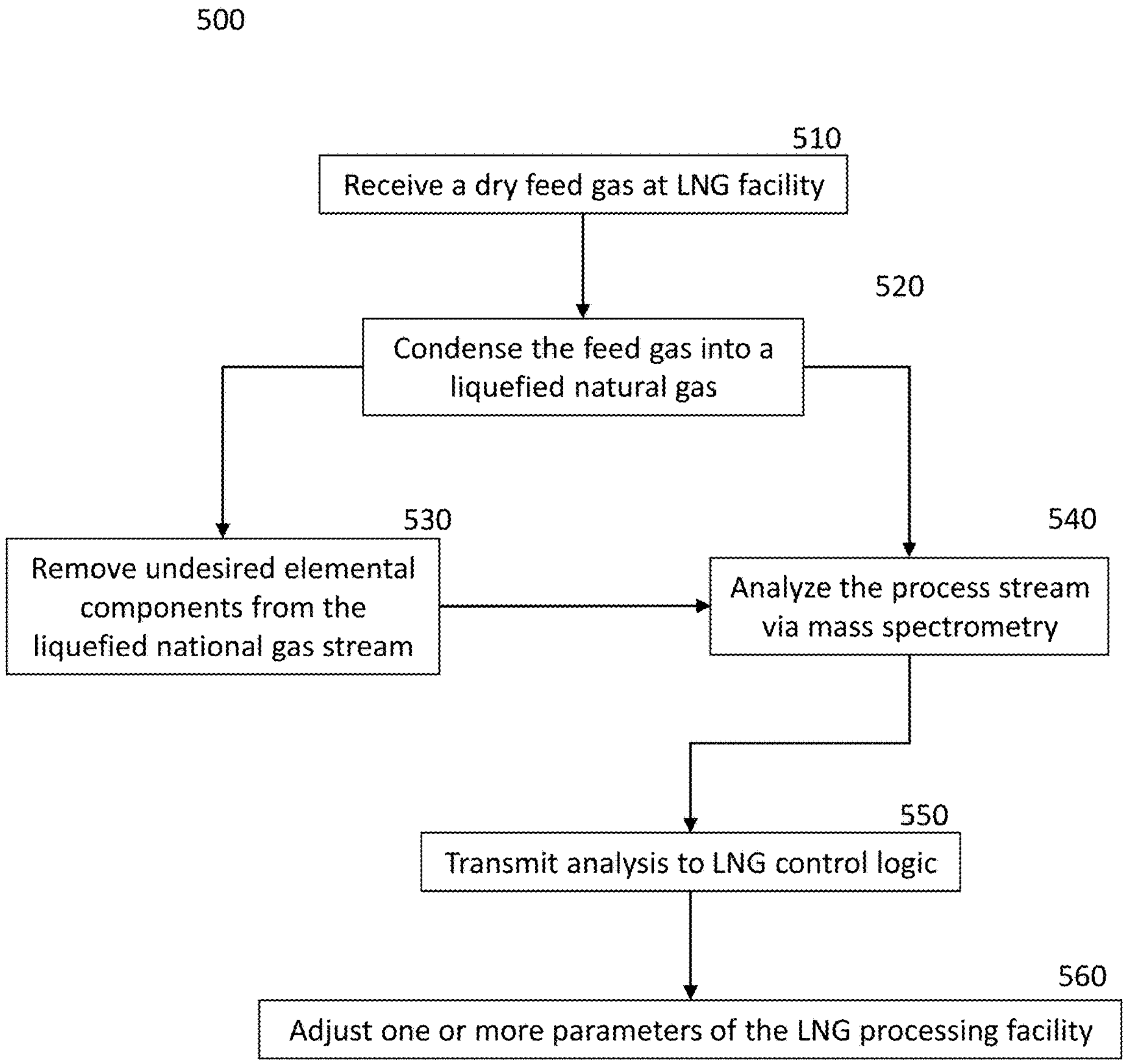
FIG. 3 illustrates example operations for improving LNG production system via a mass spectrometer analysis.

Referring to FIG. 3, the flow chart illustrates example operations 500 for improved LNG content and production using inline, real-time monitoring via mass spectrometry. In one implementation, an operation 510 one or more dry gas feed streams are received at an LNG facility. An operation 520 condenses the feed gas into a liquefied natural gas via an LNG facility as described with respect to FIG. 1. An operation 530 removes undesired elemental components from the liquefied natural gas stream. In one implementation, elemental components such as nitrogen can be removed from the liquefied natural gas stream can be removed via a nitrogen rejection unit as described above. For the purposes of simplicity, the removal of undesired element components is indicated as occurring after liquefaction, however it should be understood that the removal of undesired elemental components can occur at the same time as the liquefaction of the natural gas. In such implementations, the nitrogen rejection unit can be integrated into the LNG processing system. In the alternative, the nitrogen rejection unit can be a separate system coupled with the LNG processing system.

An operation 540 analyzes the sample process stream using the mass spectrometry data obtained from the analyzer. Specifically, the mass spectrometry analyzer can provide real-time data relating to the content levels of various elements within the process stream including, but not limited to, nitrogen ($N_2$), methane ($CH_4$), ethane ($C_2H_6$), propane ($C_3H_8$), carbon dioxide ($CO_2$), hydrogen sulfide ($H_2S$), and combinations thereof. The elemental concentrations can then be used to determine the effectiveness of the LNG system and nitrogen rejection unit. In at least one instance, a plurality of streams can be simultaneously analyzed via mass spectrometry analysis.

As indicated, process samples can be provided for analysis directly from the LNG facility (operation 520) or from an elemental removal unit (operation 530). While a single analysis is discussed herein, it should be recognized that several sample process streams can be taken and analyzed from various points throughout the operation 500.

An operation 550, transmits the compositional analysis obtained from the mass spectrometry analyzer to a control logic, such as a controller, coupled with the LNG system. The control logic can control various aspects of the liquefaction process including, but not limited to, the rate at which each of various parameters within the LNG system, including the LNG facility and the nitrogen rejection unit, operate. The rates can be used to control the condensation and removal of various elements throughout the process, allowing for changes in the final product. In at least one instance, an overall efficiency of the LNG production system is calculated based at least in part on the mass spectrometry data. In some instances, several intermediate efficiencies can be calculated based at least in part on compositional analysis performed via mass spectrometry at various points throughout the LNG production system. The intermediate and overall efficiencies can be compared to one or more predetermined thresholds, the predetermined thresholds corresponding to at least one of a desired efficiency for the liquefaction process and a desired efficiency for nitrogen removal. The desired efficiencies can include one or more of a nitrogen removal rate at various points throughout the LNG and nitrogen removal processes, a final nitrogen ($N_2$) content of the LNG product, an intermediate methane ($CH_4$) content, a final methane ($CH_4$) content of the LNG product, an intermediate ethane ($C_2H_6$) content, a final ethane ($C_2H_6$) content of the LNG product, a nitrogen/methane ($N_2/CH_4$) ratio, a nitrogen/hydrocarbon ratio, and/or any other component content which can be used to evaluate the preferred component content of the final LNG product stream.

If the component content analysis provides a result that is below the predetermined threshold, one or more parameters of the LNG production system may require adjustment. In some examples, a target range of efficiencies may be defined by a first, lower threshold value setting a lower limit and a second, higher threshold value setting an upper limit. For example, an operation 560 adjusts various aspects of the LNG processing system based on the analysis received from the mass spectrometry analyzer. In at least one instance, the various aspects of the LNG processing system can include parameters of the LNG facility and the nitrogen rejection unit which adjusts the speed and/or efficiency of the liquefaction and nitrogen removal processes. Such adjustments can include, but are not limited to, adjusting one or more of a rate, desired product content, heavies removal rate, nitrogen removal rate, and/or combinations thereof. In one implementation, the analysis of the process stream can be utilized to adjust any of the LNG components and rates automatically based on the real-time measurements. The automatic adjustments of one or more parameters can improve the LNG processing facility by increasing the efficiency, adjusting rates for each component, and adjusting the desired product composition at least partly in response to current efficiencies being below the predetermined threshold value, or being outside a threshold range. As discussed above, additional measurement points can be included throughout the LNG system to provide additional feedback to the control unit and further optimize the LNG facility. For example, if a compositional analysis at one or more points throughout the process indicates a higher than desired nitrogen ($N_2$) content, parameters of the process can be adjusted. In at least one instance, the process can repeat itself, adjusting additional parameters of the LNG processing system as necessary, until the analysis provides an efficiency that is within the predetermined threshold.

Figure 4:
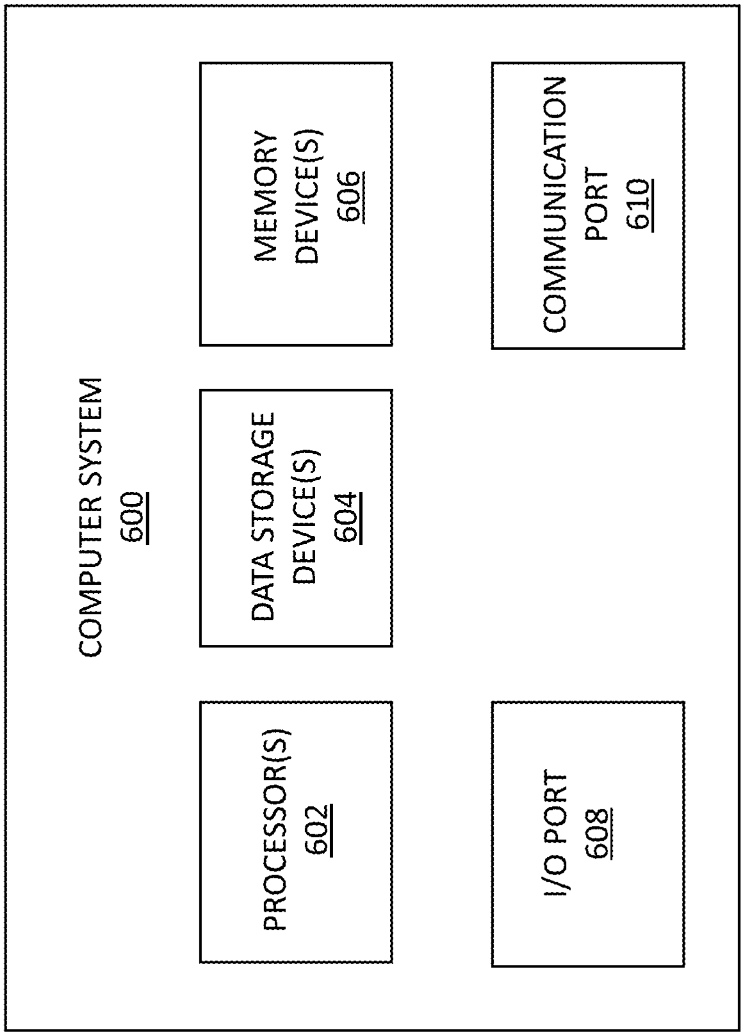
FIG. 4 depicts an example computing system that may implement various systems and methods discussed herein.

Referring to FIG. 4, a detailed description of an example computer system 600 having one or more computing units that may implement various systems and methods discussed herein is provided. The computer system 600 may be applicable to the LNG facility, nitrogen recovery unit, mass spectrometer, any computing component of the LNG processing facility, and other computing or network devices. It will be appreciated that specific implementations of these devices may be of different possible specific computing architectures not all of which are specifically discussed herein but will be understood by those of ordinary skill in the art.

The computing system 600 may be a computing system that is capable of executing a computer program product to execute a computer process. Data and program files may be input to the computer system 600, which reads the files and executes the programs therein. Some of the elements of the computer system 600 are shown in FIG. 4, including one or more hardware processors 602, one or more data storage devices 604, one or more memory devices 606, and/or one or more ports 608-610. Additionally, other elements that will be recognized by those skilled in the art may be included in the computing system 600 but are not explicitly depicted in FIG. 4 or discussed further herein. Various elements of the computer system 600 may communicate with one another by way of one or more communication busses, point-to-point communication paths, or other communication means not explicitly depicted in FIG. 4.

The one or more processors 602 may include, for example, a central processing unit (CPU), a microprocessor, a microcontroller, a digital signal processor (DSP), and/or one or more internal levels of cache. The one or more processors 602 may include a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the one or more data storage devices 604, stored on the one or more memory devices 606, and/or communicated via the one or more of the ports 608-610, thereby transforming the computer system 600 in FIG. 4 to a special purpose machine for implementing the operations described herein. Examples of the computer system 600 include, but are not limited to, personal computers, terminals, workstations, mobile phones, tablets, laptops, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manage the various components of the computing system 600. The one or more data storage devices 604 may include, without limitation, magnetic disk drives, optical disk drives, solid state drives (SSDs), flash drives, and the like. The one or more data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the one or more data storage devices 604 and/or the one or more memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some instances, the computer system 600 includes one or more ports, such as an input/output (I/O) port 608 of the one or more ports 608-610 and a communication port 610 of the one or more ports 608-610, for communicating with other computing, network, or vehicle devices. It will be appreciated that the one or more ports 608-610 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one instance, the input devices convert a human-generated signal, such as, human voice, physical movement, physical touch or pressure, and/or the like, into electrical signals as input data into the computing system 600 via the I/O port 608. Similarly, the output devices may convert electrical signals received from the computing system 600 via the I/O port 608 into signals that may be sensed as output by a human, such as sound, light, and/or touch. The input device may be an alphanumeric input device, including alphanumeric and other keys for communicating information and/or command selections to the one or more processors 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing system 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna or other link for electromagnetic signal transmission and/or reception.

In an example implementation, mass spectrometry data, and software and other modules and services may be embodied by instructions stored on the one or more data storage devices 604 and/or the one or more memory devices 606 and executed by the one or more processors 602.

The system set forth in FIG. 4 is but one possible example of the computer system 600 that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

EXAMPLES

The following examples are provided to illustrate the subject matter of the present disclosure. The examples are not intended to limit the scope of the present disclosure and should not be so interpreted.

An experimental analysis of the suitability of a mass spectrometry analyzer to replace a series of eight gas chromatograph analyzers in an LNG facility was performed. Specifically, a mass spectrometer was coupled with a nitrogen rejection unit of a downstream LNG facility such that the series of gas chromatographs and mass spectrometer could run a compositional analysis on samples taken throughout the LNG process stream in parallel. It was surprisingly determined that the mass spectrometry analyzer provided faster and more accurate results than the series of gas chromatography analyzers.

The experiment provided an opportunity to observe and assess the performance of the nitrogen rejection unit from the LNG process stream using multiple analysis methods. For example, a nitrogen rejection unit can experience a fluctuation of operating conditions in which the balance between nitrogen and hydrocarbons changes significantly throughout processing. Such fluctuations need to be monitored so that adjustments can be made to the system in order to maintain the desired nitrogen/hydrocarbon ratio. During the experiment, two data sets were compared by calculation of the linear correlation co-efficient, comparison of the mean reading and standard deviation for the period, and by comparison of the measurement lag time and the frequency of measurement update.

Each of the process streams analyzed by the series of eight gas chromatography analyzers was cyclically analyzed by the mass spectrometer analyzer. The results produced by the mass spectrometry analysis provided several benefits over the gas chromatography analysis including, but not limited to, shorter analysis time, lower delay between measurement and process, improved frequency of measurements, improved range of measurements, reduced calibration requirements, ability to cyclically measure numerous sample points of different composition, lower operational expenditure per sample point to be analyzed, and no requirement for expensive consumables (such as ultra high purity helium required for gas chromatographs).

Prior to beginning the experiment, both the series of gas chromatographs and the mass spectrometer were calibrated. The gas chromatographs were calibrated to perform a two-component analysis of methane ($CH_4$) and nitrogen ($N_2$), the mass spectrometer was also calibrated to perform a two-component analysis to provide a methane/nitrogen ($CH_4/N_2$) ratio. In addition, a three-component analysis was performed at the end of the trial period to appraise the ethane measurement performance, providing a methane ($CH_4$) content, an ethane ($C_2H_6$) content, a nitrogen ($N_2$) content, and a 3-component ratio ($CH_4/C_2H_6/N_2$).

Figure 5:
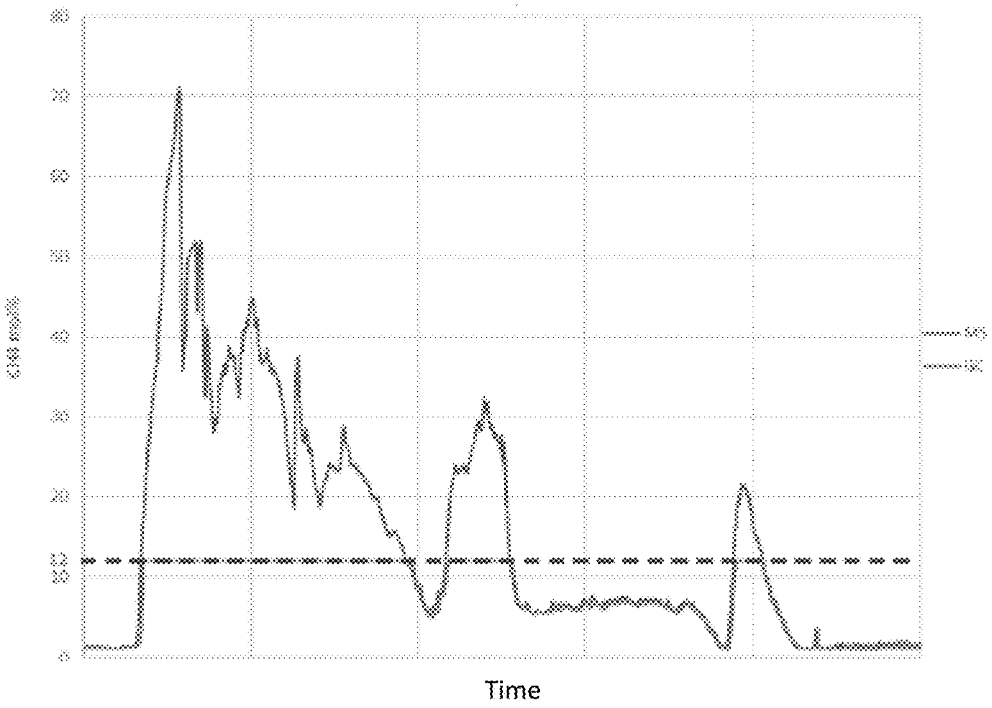
FIG. 5 is a graph illustrating the difference in mass spectrometry and gas chromatograph analysis of methane.
Figure 6:
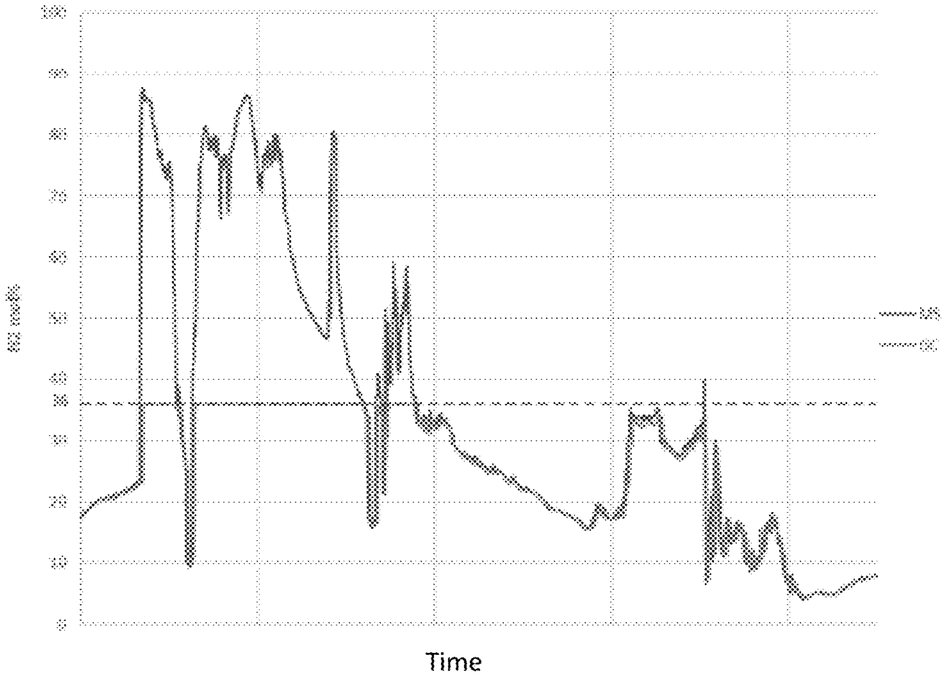
FIG. 6 is a graph illustrating the difference in mass spectrometry and gas chromatograph analysis of nitrogen.

A comparison of the ability of the mass spectrometer and the series of gas chromatographs for methane and nitrogen compositional analysis is illustrated by the graphs provided in FIGS. 5 and 6, respectively, during plant upset conditions. As illustrated, there were two periods of time where the gas chromatographs were operating outside the configured measurement limits for the analyzers. Specifically, data logging for the gas chromatograph is stopped because the measured values went outside the design measurement range of the instruments. As such, FIGS. 5 and 6 demonstrate the full scale (0-100%) measurement range of the mass spectrometer. As illustrated the absolute difference between the mass spectrometer and the gas chromatographs was determined to be less than one percent. Measurement response for the mass spectrometer was determined to be two to three minutes faster in all cases as compared to the gas chromatographs. It should be generally understood that while FIGS. 5 and 6 illustrate instrument measurements observed during the trial it does not reflect all possible implementations of gas chromatography.

Figure 7:
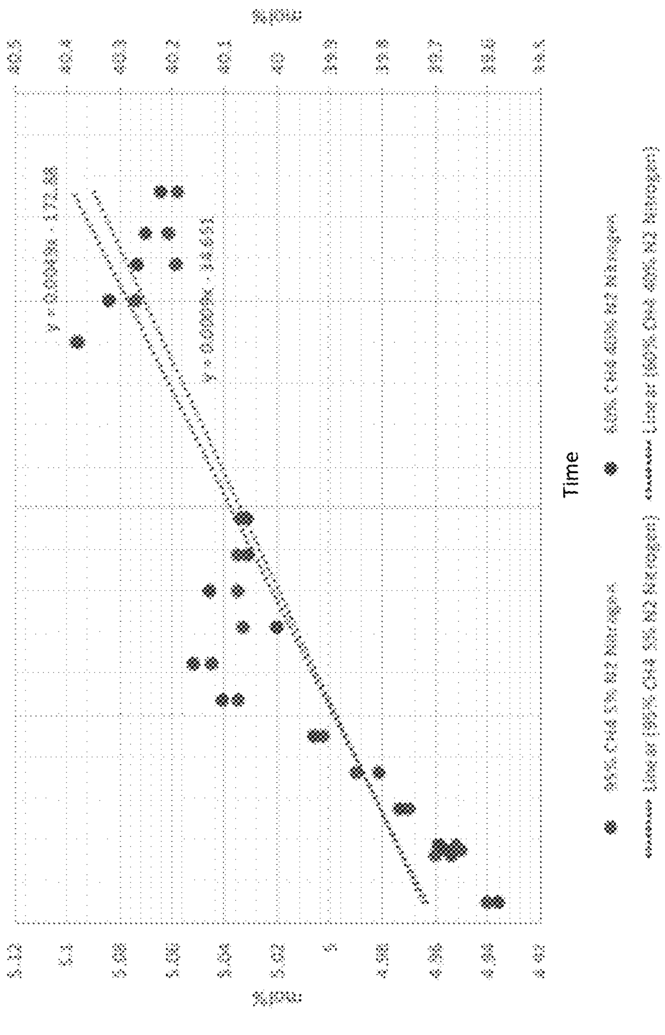
FIG. 7 is a graph illustrating calibration drift vs. time.

Additionally, drift and calibration requirements for the mass spectrometer based on the two-component analysis of methane ($CH_4$) and nitrogen ($N_2$) were assessed. Specifically, the mass spectrometer was calibrated using a single composition of 95% methane ($CH_4$) and 5% nitrogen ($N_2$) then run for the duration of the test period. Periodic validations of the measurement performance were performed using 95/5 and a 60/40 methane to nitrogen ($CH_4/N_2$) ratio mixtures. FIG. 7 provides a graph illustrating the validations and the trend over the test period. No additional calibration of the mass spectrometer was required, and the peak absolute error recorded was 0.8%.

During the experiment, the series of gas chromatographs displayed faulty operating behaviors of various degrees and required excessive maintenance, on the contrary the mass spectrometer performed reliably throughout the experimental period. Additionally, measurement response and updated frequency of the mass spectrometer was found to exceed the gas chromatographs in all operational scenarios. A performance summary is provided as Table 1, below, indicating various elements monitored throughout the experiment.

TABLE 1

| Assessment Area | Gas Chromatograph | Mass Spectrometer |
|---|---|---|
| Analysis time (sec) | 120 | 10 |
| Sample Transit Time | Defined by sampling system | Defined by sampling system |
| Measurement Delay (sec) | 120 + sample transit time | 10 + sample transit time |
| Measurement Frequency (sec) | 120 | 10 × number of samples in sequence |
| Linearity | Around calibration point | Full scale |
| Validation/Calibration interval | Daily | 3 months |
| Repeatability/Reproducibility | Achieved | Achieved |
| Operating Expense (per train) | 300k/year | 10k/year (single mass spec) |
| Maximum sample inputs | 3 (of similar composition) | 128 |
| Components of analysis | Designed for specific components | Defined within software |
| Utility requirements | UHP helium, instrument air | Instrument air, plant nitrogen |

As indicated in the table, the mass spectrometry analyzer provides several areas of improvement over the series of gas chromatographs. Several comparative advantages of the mass spectrometry analyzer include direct measurement of molecular nitrogen ($N_2$) (which competing technologies often fail to measure directly), a shorter measurement cycle, larger sample input, lower consumable and maintenance requirements, additional flexibility in analysis configuration, and improved full-scale measurement and linearity as compared to gas chromatography.

Figure 8:
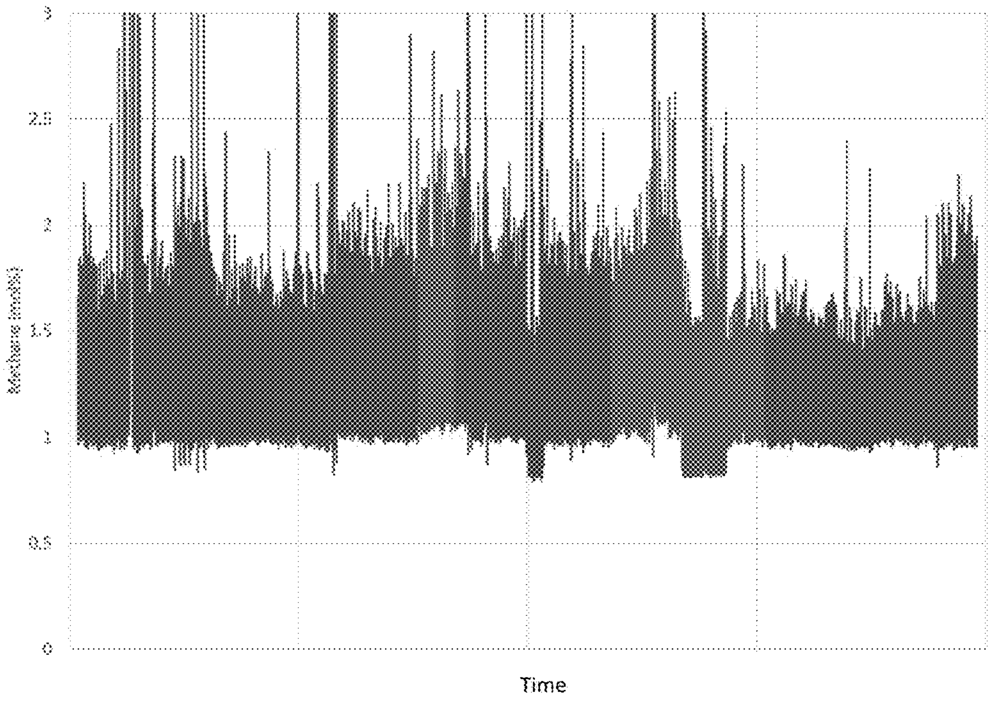
FIG. 8 is a graph illustrating the difference in a mass spectrometry and gas chromatograph analysis of methane over an extended period of time.
Figure 9:
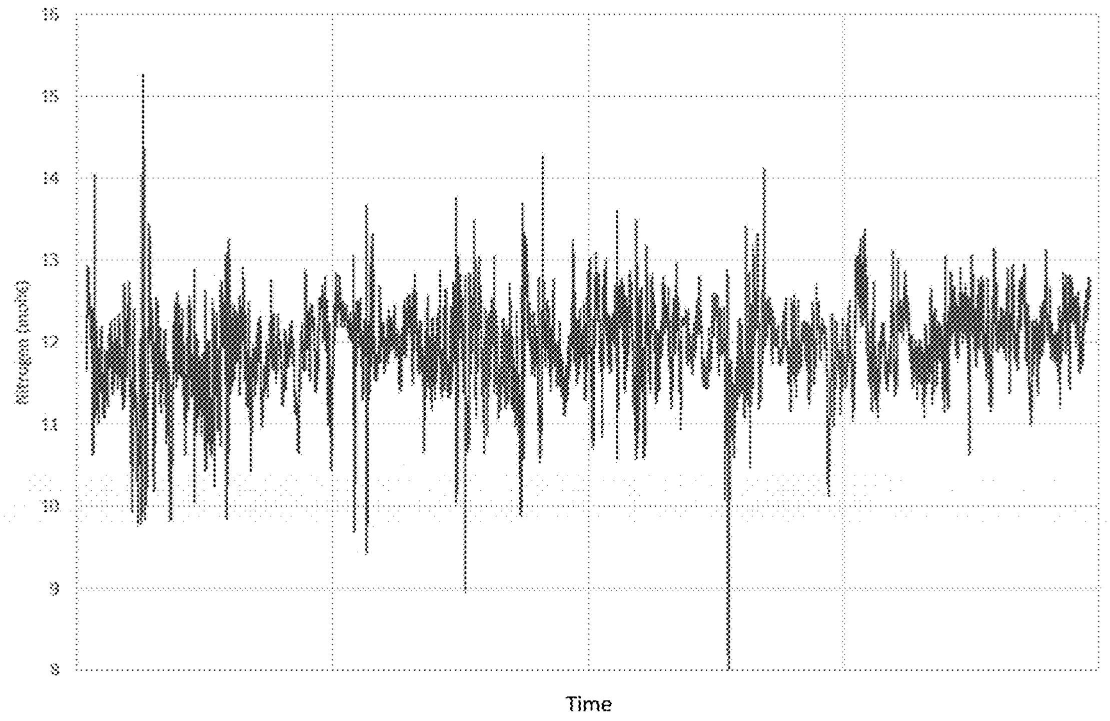
FIG. 9 is a graph illustrating the difference in a mass spectrometry and gas chromatograph analysis of nitrogen over an extended period of time.

Additionally, FIGS. 8 and 9 illustrate trends during a long-term comparison of mass spectrometry (red) and gas chromatograph (grey) analysis of methane ($CH_4$) and nitrogen ($N_2$), respectively. The comparison illustrated in FIGS. 8 and 9 includes data obtained over a roughly five month period. The two breaks in mass spectrometer data (red) are present due to data logging having been accidentally stopped.

The experimental analysis determined that replacement of the series of gas chromatographs with a single mass spectrometry analyzer would provide LNG facility savings in addition to more accurate compositional analyses. Specifically, the series of gas chromatographs require a large amount of consumables and maintenance and additionally suffer from a number of technical weaknesses including, but not limited to, poor full scale linearity, large measurement delay, and slow measurement update rate. All of which can result in significant cost to the facility.

It was determined that mass spectrometry is a viable and effective solution for performing process surveillance and control measurements in the LNG processing system. The combination of a short measurement cycle with the flexibility to integrate many sample points into a single analyzer, as well as low proven maintenance costs and requirements when contrast with the functionally equivalent number of gas chromatograph units, make the technology ideal for the analysis of process streams with a low number of significant components. In one implementation, mass spectrometry analysis can be generally applicable to gas composition measurement across the oil and gas field.

It will be appreciated that the example LNG production system 100 and example operations 500 are exemplary only and other systems or modifications to these systems may be used to improve LNG content and production using real-time monitoring using a mass spectrometry analyzer in accordance with the presently disclosed technology.

It is understood that the specific order or hierarchy of steps in the methods disclosed are instances of example approaches and can be rearranged while remaining within the disclosed subject matter. The accompanying method claims thus present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for liquefied natural gas (LNG) liquefaction, the method comprising:

receiving a gas feed stream;

condensing the gas feed stream into an LNG product stream;

removing nitrogen from the LNG product stream using a nitrogen rejection unit to produce a final LNG product stream;

determining a nitrogen content by performing a compositional analysis to generate mass spectrometry data of a plurality of process samples using mass spectrometry without gas chromatography applied to the plurality of process samples, the compositional analysis is performed on the plurality of process samples simultaneously, the plurality of process samples are taken from the final LNG product stream output by the nitrogen rejection unit and from an intermediate stream at a location before the nitrogen rejection unit;

determining a nitrogen removal rate of the nitrogen rejection unit by comparing the nitrogen content of the plurality of process samples taken from the final LNG product stream output by the nitrogen rejection unit and from the intermediate stream at the location before the nitrogen rejection unit; and controlling, via control logic, at least one of at least a portion of an LNG facility or one or more operating parameters of the nitrogen rejection unit based on changes in the nitrogen removal rate.

2. The method of claim 1, further comprising evaluating a methane ($CH_4$) content determined by the compositional analysis.

3. The method of claim 1, further comprising determining a nitrogen/methane ($N_2/CH_4$) ratio of the plurality of process samples.

4. The method of any of claim 1, wherein the compositional analysis further comprises determining an ethane ($C_2H_6$) content.

5. A method for liquefied natural gas (LNG) liquefaction, the method comprising:

receiving a gas feed stream;

condensing the gas feed stream into an LNG product stream;

removing nitrogen from the LNG product stream using a nitrogen rejection unit to produce a final LNG product stream;

determining nitrogen content by performing a compositional analysis to generate mass spectrometry data of a plurality of process samples using mass spectrometry without gas chromatography applied to the plurality of process samples, the compositional analysis is performed on the plurality of process samples simultaneously, the plurality of process samples are taken from the final LNG product stream output by the nitrogen rejection unit and from an intermediate stream at a location before the nitrogen rejection unit;

determining a nitrogen removal rate of the nitrogen rejection unit by comparing the nitrogen content of the plurality of process samples taken from the final LNG product stream output by the nitrogen rejection unit and from the intermediate stream at the location before the nitrogen rejection unit; and controlling, via control logic, at least one of one or more LNG facility parameters of an LNG facility or one or more operating parameters of the nitrogen rejection unit based on changes in the nitrogen removal rate.

6. The method of claim 5, wherein the compositional analysis is performed by a mass spectrometer and further provides one or more of a methane ($CH_4$) content, or an ethane ($C_2H_6$) content.

7. The method of claim 5, further comprising:

transmitting, via a communications network, the compositional analysis of the mass spectrometry to a controller; and calculating, using the controller, an efficiency for the LNG facility based on the compositional analysis of the mass spectrometry.

8. The method of claim 7, further comprising:

determining whether the efficiency of the LNG facility exceeds a predetermined threshold.

9. The method of claim 8, when the efficiency exceeds the predetermined threshold, further comprising:

calculating one or more adjustments to the LNG facility based on whether the efficiency is below the predetermined threshold; and transmitting, via the communications network, the one or more adjustments to the LNG facility.

10. The method of claim 9, wherein the one or more adjustments are based in part on at least one of the nitrogen ($N_2$) content, a methane ($CH_4$) content, or an ethane ($C_2H_6$) content of the plurality of process samples.

11. A system for liquefied natural gas (LNG) liquefaction, the system comprising:

an LNG facility operable to condense a gas feed stream received at the LNG facility into a LNG product stream;

a nitrogen rejection unit coupled with the LNG facility, the nitrogen rejection unit operable to remove nitrogen from the LNG product stream to produce and output a final LNG product stream;

an analyzer coupled with the LNG facility and operable to obtain mass spectrometry data for a plurality of process samples simultaneously, the analyzer including a mass spectrometer without a gas chromatograph, the plurality of process samples taken from the final LNG product stream output by the nitrogen rejection unit and from an intermediate stream at a location before the nitrogen rejection unit, the analyzer determining a nitrogen removal rate of the nitrogen rejection unit by comparing a nitrogen content of the plurality of process samples taken from the final LNG product stream output by the nitrogen rejection unit and from the intermediate stream at the location before the nitrogen rejection unit; and control logic operable to control at least one of one or more LNG facility parameters of the LNG facility or one or more operating parameters of the nitrogen rejection unit based on changes in the nitrogen removal rate.

12. The system of claim 11, further comprising the control logic operable to receive the mass spectrometry data from the analyzer and determine whether an efficiency of the LNG facility exceeds a predetermined threshold.

13. The system of claim 12, wherein the control logic is further operable to calculate, when the efficiency is below the predetermined threshold, one or more adjustments of the LNG facility to cause the efficiency to increase.

14. The system of claim 13, wherein the control logic is further operable to transmit, via a communications network, the one or more adjustments to the LNG facility.

15. The system of claim 14, wherein a compositional analysis of the mass spectrometry data includes at least one of the nitrogen ($N_2$) content, a methane ($CH_4$) content, or an ethane ($C_2H_6$) content.

* * * * *